(12) United States Patent
Lahav et al.

(10) Patent No.: US 11,257,372 B2
(45) Date of Patent: Feb. 22, 2022

(54) REVERSE-FACING ANTI-COLLISION SYSTEM

(71) Applicant: Intel Corporation, Santa Clara, CA (US)

(72) Inventors: Jonathan Lahav, Nof Ayalon (IL); Gal Zion, Modiin (IL)

(73) Assignee: Intel Corporation, Santa Clara, CA (US)

( * ) Notice: Subject to any disclaimer, the term of this patent is extended or adjusted under 35 U.S.C. 154(b) by 521 days.

(21) Appl. No.: 15/855,826

(22) Filed: Dec. 27, 2017

(65) Prior Publication Data

US 2019/0051184 A1 Feb. 14, 2019

(51) Int. Cl.
| | | |
|---|---|---|
| *G08G 1/16* | (2006.01) | |
| *G06K 9/00* | (2006.01) | |
| *B60Q 1/52* | (2006.01) | |
| *B60Q 1/50* | (2006.01) | |
| *G01S 13/931* | (2020.01) | |
| *G01S 17/931* | (2020.01) | |

(52) U.S. Cl.
CPC ........... *G08G 1/166* (2013.01); *B60Q 1/50* (2013.01); *B60Q 1/525* (2013.01); *G01S 13/931* (2013.01); *G01S 17/931* (2020.01); *G06K 9/00805* (2013.01); *B60Q 2400/50* (2013.01); *G01S 2013/93272* (2020.01)

(58) Field of Classification Search
None
See application file for complete search history.

(56) References Cited

U.S. PATENT DOCUMENTS

| | | | | |
|---|---|---|---|---|
| 3,697,946 A | * | 10/1972 | Nishioka | B60Q 1/38 340/478 |
| 3,949,362 A | * | 4/1976 | Doyle | B60Q 1/525 340/435 |
| 4,807,101 A | * | 2/1989 | Milde, Jr. | B60Q 1/46 340/472 |
| 5,162,794 A | * | 11/1992 | Seith | B60Q 1/525 340/903 |
| 5,347,261 A | * | 9/1994 | Adell | B60Q 1/38 307/10.8 |
| 5,528,217 A | * | 6/1996 | Adams | B60Q 9/008 180/169 |
| 5,760,708 A | * | 6/1998 | Seith | G01S 13/931 340/903 |
| 6,014,596 A | * | 1/2000 | Bess | B60Q 1/2611 340/468 |
| 6,121,915 A | * | 9/2000 | Cooper | G01S 13/584 342/70 |
| 9,415,776 B2 | * | 8/2016 | Schwindt | B60W 30/12 |

(Continued)

*Primary Examiner* — Fekadeselassie Girma
(74) *Attorney, Agent, or Firm* — Schwegman Lundberg & Woessner, P.A.

(57) ABSTRACT

Various systems and methods for implementing a reverse-facing anti-collision mechanism are described herein. An anti-collision system for a lead vehicle to provide an alert to a trailing vehicle behind the lead vehicle, includes a vehicle controller subsystem to receive from a sensor array interface, sensor data from a rear-facing sensor incorporated into the lead vehicle; determine, using a processor, from the sensor data that the trailing vehicle is a collision risk; and initiate, via a light controller, a visual alert to the trailing vehicle, the visual alert in addition to or in place of brake lights on the lead vehicle.

22 Claims, 7 Drawing Sheets

(56) References Cited

U.S. PATENT DOCUMENTS

| | | | |
|---|---|---|---|
| 9,545,922 B1* | 1/2017 | Sim | B60W 30/12 |
| 9,946,940 B2* | 4/2018 | Gupta | G06K 9/00798 |
| 10,077,046 B2* | 9/2018 | Lewis | B60D 1/36 |
| 2002/0105416 A1* | 8/2002 | Kore | B60R 21/013 |
| | | | 340/425.5 |
| 2004/0122573 A1* | 6/2004 | Mizutani | B60T 7/22 |
| | | | 701/45 |
| 2005/0134441 A1* | 6/2005 | Somuah | B60Q 1/503 |
| | | | 340/435 |
| 2006/0028328 A1* | 2/2006 | Cresse | G01S 17/931 |
| | | | 340/435 |
| 2006/0048420 A1* | 3/2006 | Fried | G09F 21/04 |
| | | | 40/592 |
| 2009/0024357 A1* | 1/2009 | Aso | G08G 1/167 |
| | | | 702/181 |
| 2010/0063728 A1* | 3/2010 | Jung | G08G 1/161 |
| | | | 701/533 |
| 2010/0182139 A1* | 7/2010 | Chen | B60W 30/12 |
| | | | 340/435 |
| 2011/0264302 A1* | 10/2011 | Tsunekawa | B60W 40/072 |
| | | | 701/1 |
| 2012/0268260 A1* | 10/2012 | Miller | B60W 50/14 |
| | | | 340/435 |
| 2013/0002414 A1* | 1/2013 | Konet | B60K 37/06 |
| | | | 340/436 |
| 2013/0148375 A1* | 6/2013 | Connor | B60Q 1/30 |
| | | | 362/554 |
| 2013/0169449 A1* | 7/2013 | Tsunekawa | G08G 1/166 |
| | | | 340/933 |
| 2014/0005906 A1* | 1/2014 | Pandita | B60W 40/04 |
| | | | 701/96 |
| 2014/0368324 A1* | 12/2014 | Seifert | B60Q 1/444 |
| | | | 340/435 |
| 2015/0012185 A1* | 1/2015 | Harda | B60W 30/08 |
| | | | 701/45 |
| 2015/0193885 A1* | 7/2015 | Akiva | G07C 5/0841 |
| | | | 705/4 |
| 2016/0016509 A1* | 1/2016 | Schleicher | B60Q 1/46 |
| | | | 340/903 |
| 2016/0023589 A1* | 1/2016 | Warner | B60Q 1/0035 |
| | | | 315/77 |
| 2017/0050415 A1* | 2/2017 | Kanki | B60J 1/001 |
| 2018/0001764 A1* | 1/2018 | Bang | B60K 31/0008 |
| 2018/0005503 A1* | 1/2018 | Kaindl | G08G 1/166 |
| 2018/0190027 A1* | 7/2018 | Yao | G06F 3/011 |

* cited by examiner

REVERSE-FACING ANTI-COLLISION SYSTEM

TECHNICAL FIELD

Embodiments described herein generally relate to accident avoidance systems, and in particular, to a reverse-facing anti-collision system.

BACKGROUND

In the automotive context, advanced driver assistance systems (ADAS) systems are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

While an increasing number of vehicles use ADAS, there remain vehicles that are not equipped. Drivers of vehicles that do not include ADAS features are at an increased risk of collisions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

ADAS includes various forward, sideward, and rearward facing sensors in a vehicle. The sensors may include radar, LIDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

Although ADAS is used in increasing numbers of vehicle manufactured today, there are still large numbers of vehicles that do not have such features. What is needed is a mechanism to leverage ADAS installations in some vehicles to provide safer driving for those in ADAS-free vehicles.

The systems and methods described here include an ADAS that may be implemented on a vehicle in front (lead vehicle) of another vehicle (following or trailing vehicle), to alert or warn the trailing vehicle of certain conditions. For instance, brake lights are activated when a vehicle is slowing down and stopped. However, a vehicle following is unable to determine whether the preceding vehicle is still slowing down or stopped based on just the brake lights alone. As such, the following vehicle may be approaching the lead vehicle too fast to avoid a collision. Using the mechanisms described here, the lead vehicle may provide a visual warning to the following vehicle that is distinct from brake lights and able to warn the driver of the following vehicle.

In various embodiments, which will be described further below, the lead vehicle may be equipped with rear-facing sensors to detect the speed and distance of the trailing vehicle. If the speed and distance indicate a potential collision, then the lead vehicle may produce a distinct visual signal, such as flickering extra lights around the brake light housing, to alert the following driver. While potentially more useful to a driver who is driving a vehicle without ADAS, such a mechanism is also useful to a driver who has an ADAS-equipped vehicle. Additional embodiments are described below with reference to the FIGS.

Figure 1:
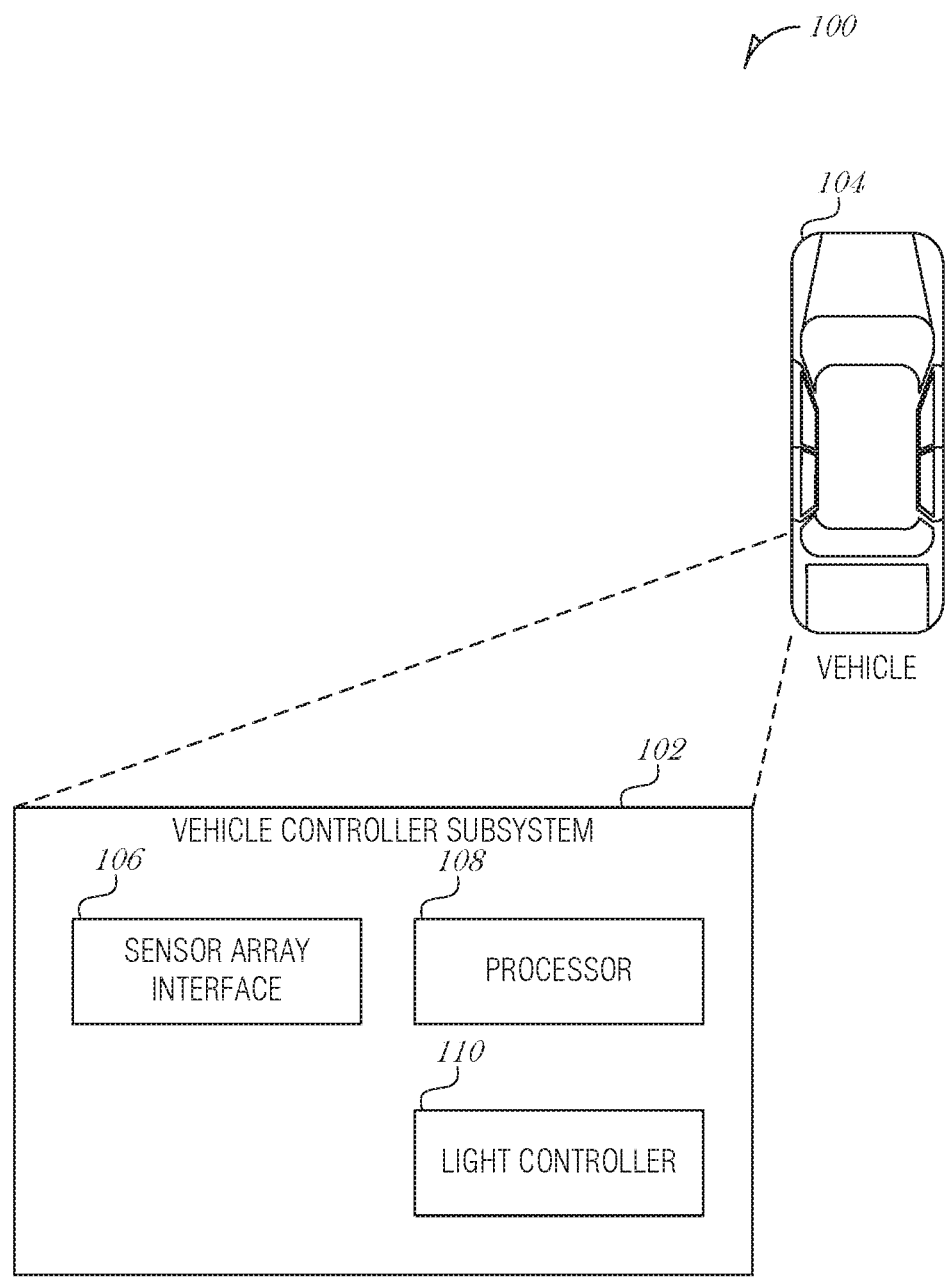
FIG. 1 is a schematic drawing illustrating a system to control a vehicle, according to an embodiment.

FIG. 1 is a schematic drawing illustrating a system 100 to control a vehicle 104, according to an embodiment. FIG. 1 includes a vehicle controller subsystem 102 incorporated into the vehicle 104.

The vehicle 104 may be of any type of vehicle, such as a commercial vehicle, a consumer vehicle, a recreation vehicle, a car, a truck, a motorcycle, or a boat, able to operate at least partially in an autonomous mode. The vehicle 104 may operate at some times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 includes a sensor array, which may include various forward, side, and rearward facing cameras, radar, LIDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle. Cameras in the sensor array may include infrared or visible light cameras, able to focus at long-range or short-range with narrow or large fields of view.

The vehicle 104 includes an on-board diagnostics system to record vehicle operation and other aspects of the vehicle's performance, maintenance, or status. The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Components of the vehicle controller subsystem 102 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In operation, the vehicle 104 obtains sensor data via sensor array interface 106 from rear-facing sensors to detect the approach speed and distance of a following vehicle. The rear-facing sensors may include radar, LIDAR, visible light cameras, or combinations. Radar is useful in nearly all weather and longer range detection, LIDAR is useful for shorter range detection, cameras are useful for longer ranges but often become less effective in certain weather conditions, such as snow. Combinations of sensors may be used to provide the widest flexibility in varying operating conditions.

Based on the approach speed and the distance between the lead vehicle and the trailing vehicle, a processor 108 in the vehicle controller subsystem 102 is able to determine whether a possible collision may occur. Based on this determination, the vehicle controller subsystem 102 may initiate one or more warning lights. The processor 108 interfaces with light controller 110 to produce warning lights according to the configuration of the vehicle controller subsystem 102.

The light controller 110 may interface with one or more lights that are installed on the vehicle 104. The lights (not shown) may be incorporated into the taillight cluster of the vehicle 104. The lights may be in a separate housing than the taillight cluster. For instance, the lights may be in a separate light bar that is mounted in the rear window of the vehicle 104, in a light bar that is mounted under the bumper of the vehicle 104, or a light bar that is mounted on the roof of the vehicle 104. The light bar may include one or more lights that flash, blink, change intensity, or otherwise provide a visual warning to a driver of a following vehicle. Other implementations and placement are understood to be within the scope of this disclosure.

In other implementations, the light controller 110 may interface with a light projector to project a warning light on a rear window of the vehicle 104, or to project a warning light on the roadway behind the vehicle. The warning light may be a light pattern, a message, an icon or symbol, or other displays that are designed to attract the attention and warn the driver of the following vehicle.

In other implementations, the light controller 110 may interface with another emitter capable of emitting radio frequency (RIP), infrared, or the like. The trailing vehicle may have a sensor capable of detecting the emitted signal. In this way, the light controller 110 may provide signaling directly to trailing vehicles using a reverse-facing emitter. Upon receipt of a signal, the trailing vehicle may trigger an alarm, provide automatic braking, or other collision avoidance mechanisms.

The vehicle controller subsystem 102 may be installed as an after-market component of the vehicle, or may be provided as a manufacturer option. As an after-market component, the vehicle controller subsystem 102 may plug into the existing ADAS in the vehicle 104 to obtain sensor data and may provide the warning lights. Alternatively, the vehicle controller subsystem 102 may incorporate its own sensor array to sense following vehicles.

Figure 2A:
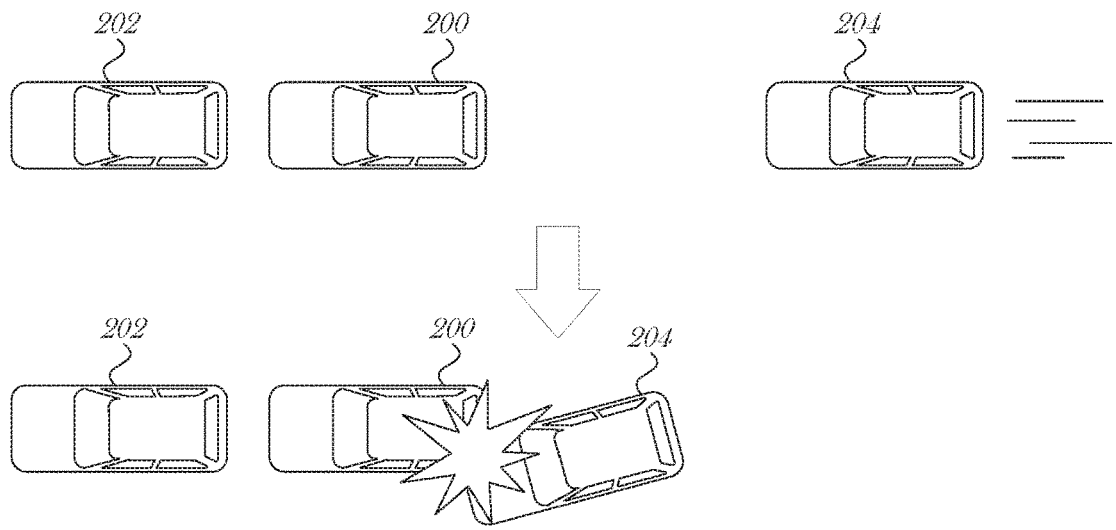
FIGS. 2A and 2B are an illustration of a potential use case, according to an embodiment.
Figure 2B:
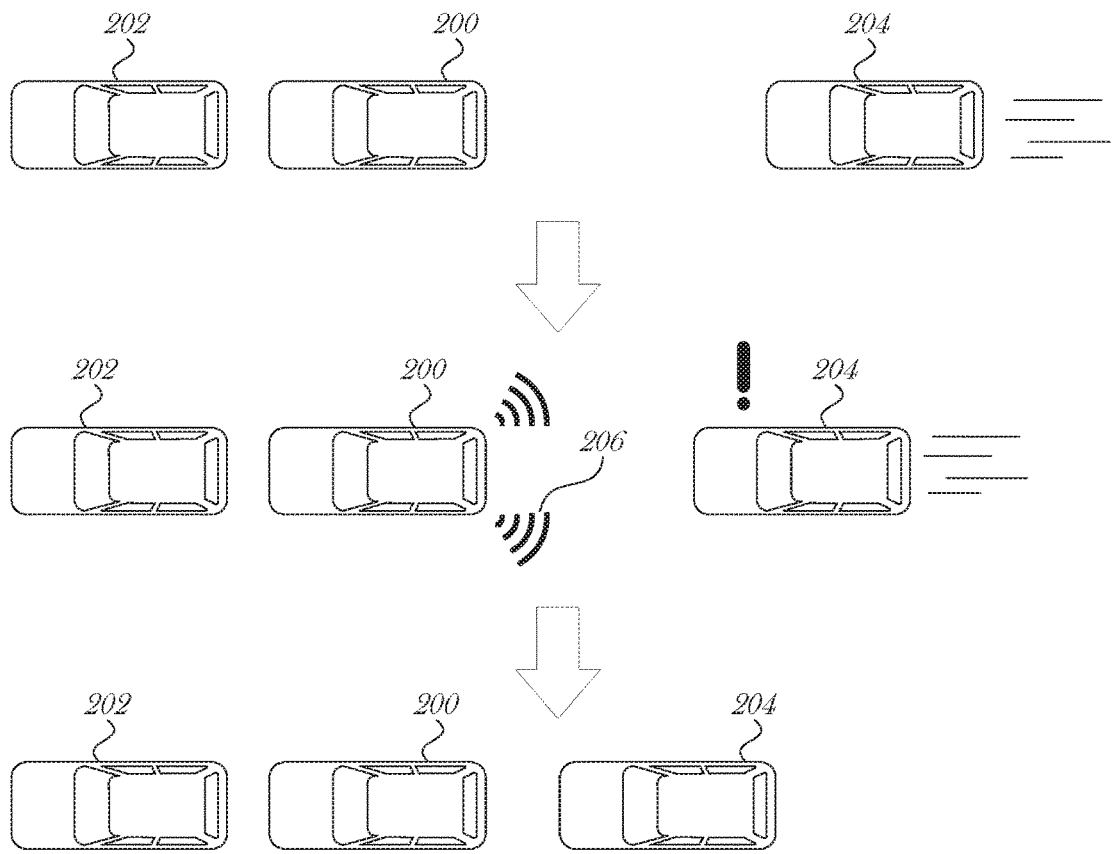

FIGS. 2A and 2B are an illustration of a potential use case, according to an embodiment. In FIG. 2A, a lead vehicle 200 is stopped on the road. The lead vehicle 200 may be stopped due to a traffic jam, a red light, a weather event, or some other situation. In the example illustrated in FIG. 2A, the lead vehicle 200 is stopped behind one or more other vehicles 202. A trailing vehicle 204 is traveling at a high speed and approaching the lead vehicle 200 and the other vehicles 202. In some cases, the brake lights used on the lead vehicle 200 do not convey whether the lead vehicle 200 is slowing down or at a full stop. The operator of the trailing vehicle 204 may not notice that the lead vehicle 200 is stopped instead of just slowing down. The operator of the trailing vehicle 204 may be distracted or may be unable to discern the motion of the lead vehicle 200 due to the environment (e.g., heavy snow or fog, darkness without street lights, or the like). The trailing vehicle 204 does not recognize that the lead vehicle 200 is stopped until it is too late—resulting in a collision or the trailing vehicle 204 swerving off of the road.

In FIG. 2B, the lead vehicle 200 is equipped with a rear-facing alert system with functionality as described herein. The lead vehicle 200 is stopped behind the other vehicles 202, as in FIG. 2A. The lead vehicle 200 detects the approaching trailing vehicle 204 and based on a determination of whether the trailing vehicle 204 is traveling too fast, produces a signal 206 to alert the trailing vehicle 204. In the example illustrated in FIG. 2B, the trailing vehicle 204 has time to react and slow down to avoid a collision. The trailing vehicle 204 may have its own ADAS onboard, but it may not provide sufficient notice to the operator. As such, if the trailing vehicle 204 has an automatic braking or other collision avoidance system, the trailing vehicle 204 may take evasive action or slow down without operator input. The signals provided by the lead vehicle 200 may be detected with cameras on the trailing vehicle 204, for instance. Instead of taking autonomous action, the trailing vehicle 204 may instead notify the operator using additional user interfaces, such as voice, haptics, sounds, light, or combinations.

Figure 3:
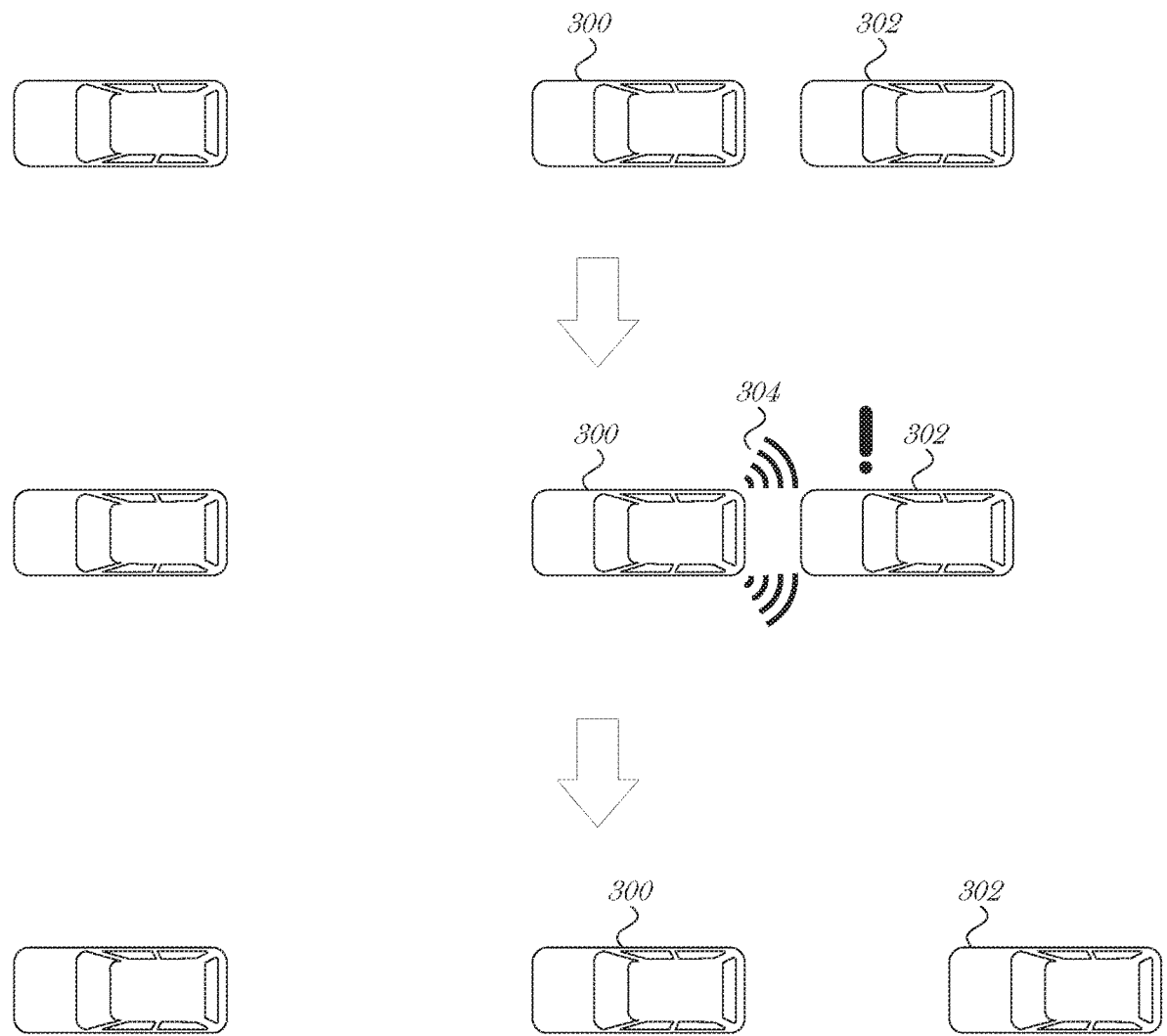
FIG. 3 is an illustration of another use case, according to an embodiment.

FIG. 3 is an illustration of another use case, according to an embodiment. In FIG. 3, a lead vehicle 300 is traveling in front of a trailing vehicle 302. The trailing vehicle 302 may be approaching or following too close to the lead vehicle 300. If the trailing vehicle 302 is approaching too fast (e.g., approaching with a relative speed in excess of ten miles per hour), or following too close (e.g., following closer than 190 feet at 65 miles per hour). The thresholds for what is considered "too fast" or "too close" may be configurable by the vehicle manufacturer, local authority, vehicle owner, or other party. For instance, the 2-second rule for following distance may be used to determine whether a trailing vehicle is following too close. However, this general rule may be modified based on laws, user preferences, vehicle abilities, or the like. In general, the thresholds for determining whether a trailing vehicle is approaching too fast or following too close is determined by using an estimated reaction time of the trailing vehicle in case of an emergency.

Returning to the discussion of FIG. 3, the trailing vehicle 302 may be following the lead vehicle 300 too close, and in response the lead vehicle 300 may activate a visual signal 304 to warn the trailing vehicle 302 or the operator of the trailing vehicle 302. In view of the warning, the trailing vehicle 302 may fall back and continue following the lead vehicle 300 at a safe distance.

Figure 4A:
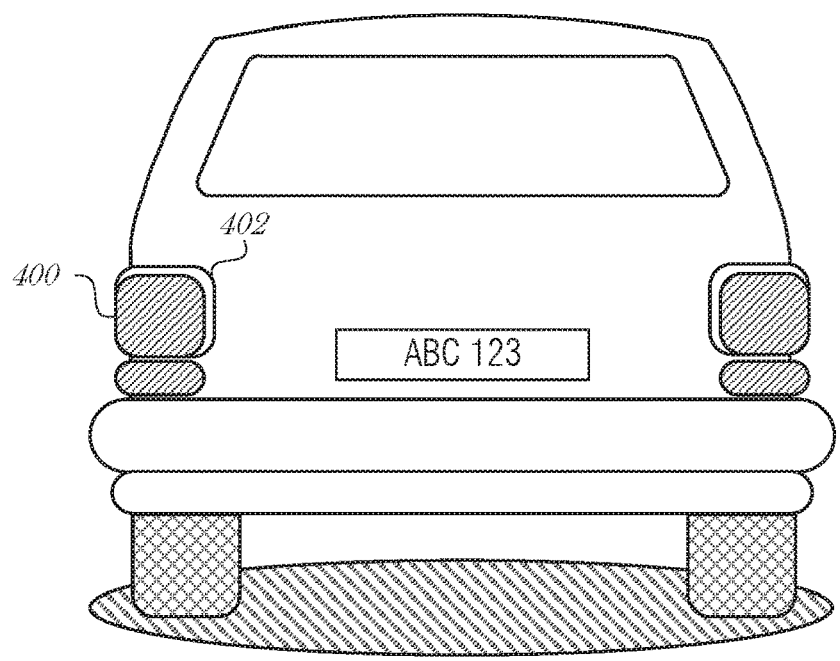
FIGS. 4A-D are illustrations of rear-facing presentations, according to various embodiments.

FIGS. 4A-D are illustrations of rear-facing presentations, according to various embodiments. In FIG. 4A, a taillight cluster 400 is modified with an additional light 402 around the outside of the cluster 400. The additional light 402 may illuminate when the vehicle senses a trailing vehicle that is approaching too fast or following too close. The additional light 402 may illuminate in a variety of ways, such as with a particular blinking pattern, with a different colored light (e.g., blue) than the regular brake lights in the taillight cluster 400, with a different intensity than that of the brake light, or the like.

Figure 4B:
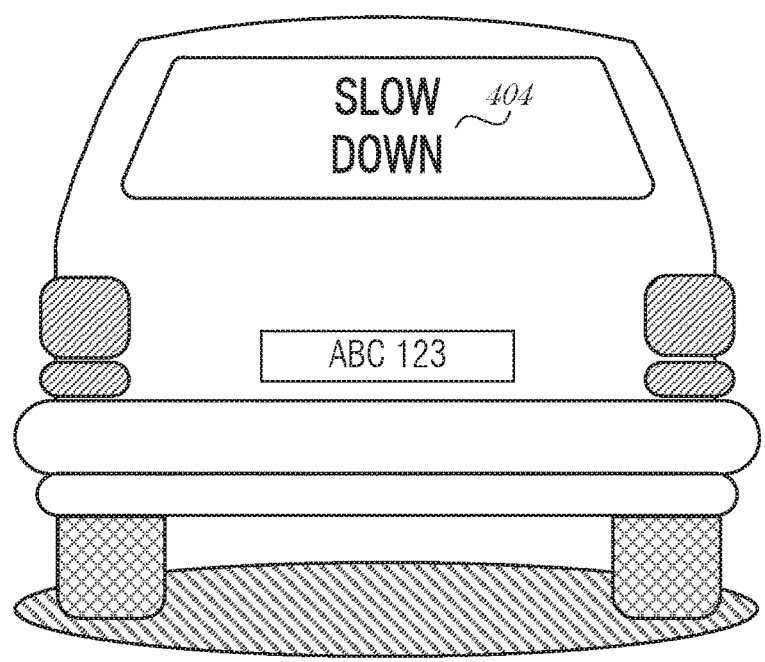

FIG. 4B illustrates another rear-facing presentation where a warning 404 is projected onto the rear window of the vehicle. The warning 404 may be projected using a projector (e.g., a pico projector) installed in the window frame, for example. Optionally, the rear window may include a translucent or transparent display (e.g., a see-through light-emitting diode (LED) display) upon which the warning 404 may be presented.

Figure 4C:
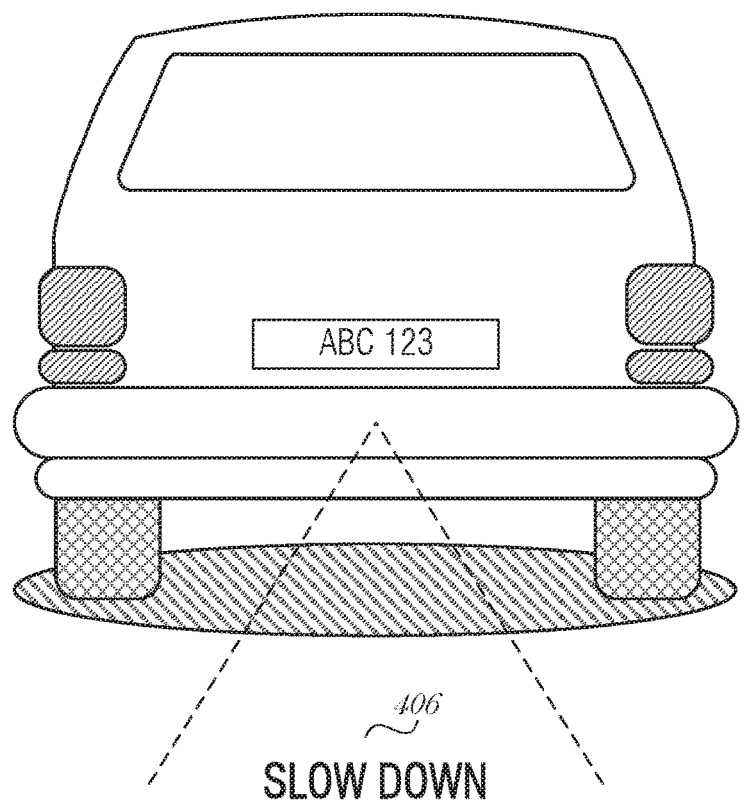

FIG. 4C illustrates another rear-facing presentation where a warning 406 is projected onto a road surface behind the vehicle. The warning 406 may be composed of various flashing lights, colors, text, or other visual stimuli to attract the attention of the operator of a trailing vehicle, for example.

Figure 4D:
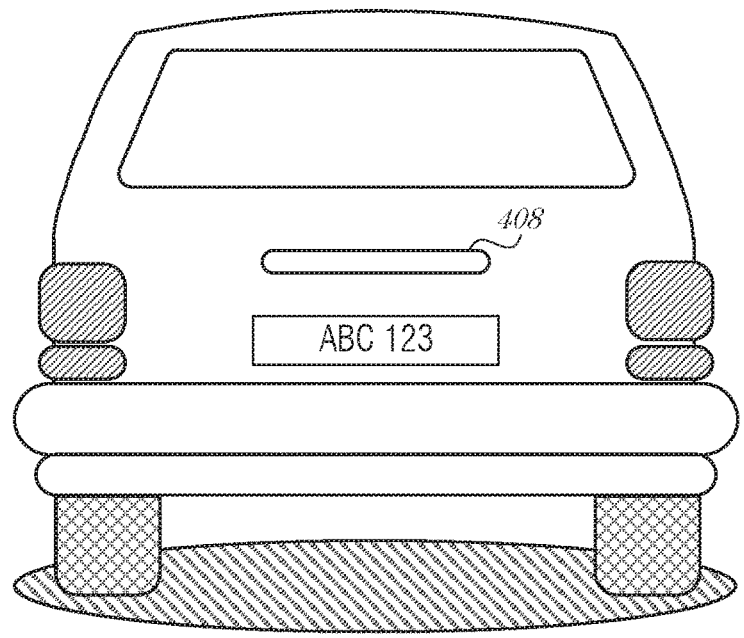

FIG. 4D illustrates another rear-facing presentation where a warning light 408 is affixed to the vehicle. The warning light 408 may be close to the taillight cluster or apart from it, based on the implementation. As with other embodiments in FIGS. 4A-C, the warning light 408 may use flashing lights, colors, text, or other visual stimuli to attract the attention of the operator of a trailing vehicle.

Optionally, instead of using a modified taillight, additional light, or other display technology, the existing taillights may be adapted to be used as the warning light. For instance, existing brake lights may be flashed using a certain blinking pattern to attract attention and signal a dangerous situation to a trailing vehicle or operator behind the vehicle. As another example, existing brake lights may be increased in intensity, alternatively flashed (e.g., left-right-left), or the like. Turn signals may be used as part of the signal or in place of brake lights. Similarly, reverse lights may be used in combination with turn signal lights or brake lights, or reverse lights may be used without the other lights. Many vehicles include a third brake light in a high position, usually in a rear window or above the frame of the rear window. This third brake light may be used in concert with one or more other lights to indicate a potential collision.

Figure 5:
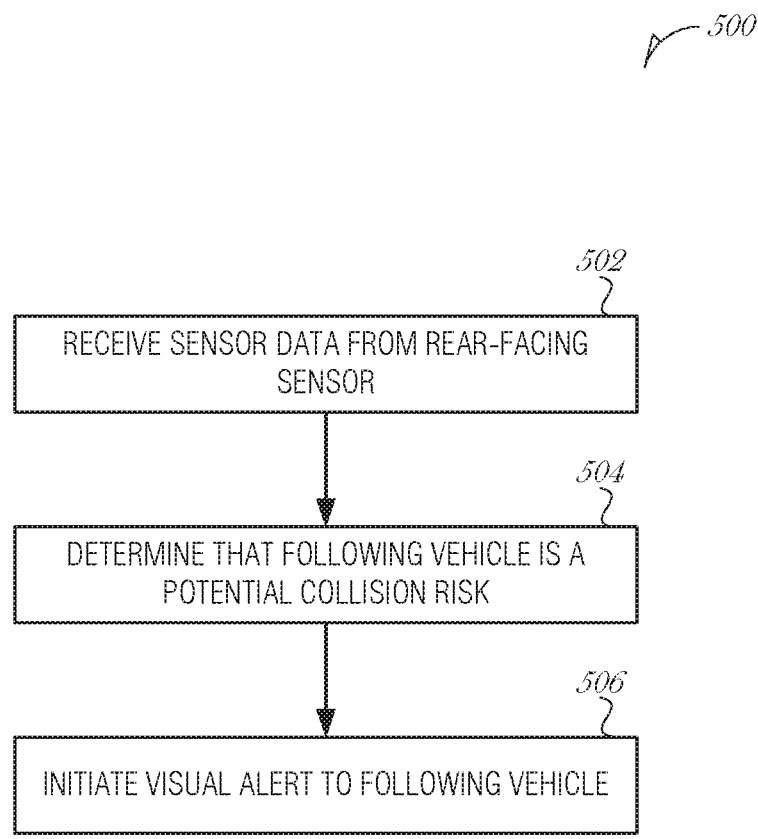
FIG. 5 is a flowchart illustrating a method for a lead vehicle to provide an alert to a trailing vehicle behind the lead vehicle, according to an embodiment.

FIG. 5 is a flowchart illustrating a method 500 for a lead vehicle to provide an alert to a trailing vehicle behind the lead vehicle, according to an embodiment. At 502, sensor data is received from a rear-facing sensor incorporated into the lead vehicle. In an embodiment, the rear-facing sensor is a radar sensor. In a related embodiment, the rear-facing sensor is a LIDAR sensor. In a related embodiment, the rear-facing sensor is a camera sensor.

At 504, it is determined from the sensor data that the trailing vehicle is a collision risk. In an embodiment, determining from the sensor data that the trailing vehicle is the collision risk includes determining a distance between the lead vehicle and the trailing vehicle, determining a relative velocity of the trailing vehicle with respect to the lead vehicle, and determining that the collision risk exists when the distance is not far enough for the trailing vehicle to safely maneuver in view of the relative velocity. This determination may be performed using an average person's response time, the traveling speed of the lead vehicle, the road conditions, environmental factors (e.g., weather), vehicle conditions (e.g., brake wear, type of vehicle, etc.), or other factors.

At 506, a visual alert is initiated to the trailing vehicle, the visual alert in addition to or in place of brake lights on the lead vehicle.

In an embodiment, initiating the visual alert comprises initiating an illumination pattern on a taillight cluster of the lead vehicle. In such an embodiment, the illumination pattern may be a series of flashing lights in the taillight cluster. The brake lights may flash at a high frequency (e.g., 5 Hz) to indicate to the trailing vehicle that the lead vehicle is a potential collision risk. Multiple lights may be flashed. As such, in an embodiment, the series of flashing lights comprises at least two of: a brake light, a turn signal, or a reverse light of the taillight cluster. For instance, the brake light and turn signal may both flash at 3 Hz. This distinct use of the taillights may be easily recognizable as another type of warning to the following driver.

In an embodiment, initiating the visual alert comprises initiating an illumination intensity change on a taillight duster of the lead vehicle. For example, the brake lights may be intensified. Alternatively, the brake lights may intensify and then return to normal illumination, in a pulsing pattern. Other lights in a taillight or third brake light may be intensified as well. As such, in an embodiment, the illumination intensity change comprises increasing an illumination intensity of at least one of: a brake light, a turn signal, or a reverse light of the taillight cluster.

In an embodiment, initiating the visual alert comprises alternatively flashing a light in a left taillight cluster and a light in a right taillight cluster of the lead vehicle. One or more lights in each taillight cluster may be illuminated in this mode of operation.

In an embodiment, initiating the visual alert comprises projecting a visual warning on a rear window of the lead vehicle. The visual warning may be projected using a projector. Alternatively, the visual warning may be displayed using a transparent or translucent display surface in the rear window, such as a transparent MED screen. The visual warning may be of any type of composition, including but not limited to monochrome, full RGB, text, pictures, icons, animation, or the like. Commonly understood symbols, such as a stop sign, may be projected. In an embodiment, the visual warning is one of: a textual message, an icon, a symbol, or a light pattern.

In an embodiment, initiating the visual alert comprises projecting a visual warning on a roadway surface behind the lead vehicle. As with a rear-window projection, the visual warning may be of any type of presentation, such as icon, animation, light show, or the like. In an embodiment, the visual warning is one of: a textual message, an icon, a symbol, or a light pattern. The roadway projection may be used only at certain times when it is easier to see such a projection. For instance, the lead vehicle may only use roadway projections after sunset.

In an embodiment, initiating the visual alert comprises illuminating a light that is not a part of a taillight and not a part of a third-brake light assembly of the lead vehicle. A dedicated light may be used for rearward alerts that is distinct from a backup light, a brake light, or a turn signal indicator. Use of a dedicated light assembly may increase production costs of a vehicle, but may decrease possible confusion to trailing vehicles. The dedicated light may be in various form factors, shapes, and positions on the lead vehicle. For example, the dedicated light may be an illuminated frame around the rear window, a separate light on top of the lead vehicle, a down-facing light under the rear bumper of the lead vehicle, on the corners near the roofline of the lead vehicle, amongst other places. The dedicated light may be of a different color than other lights on the lead vehicle. For example, where the brake light is red, the turn signal is yellow, and the backup light is white, the dedicated light may be blue or green.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 6:
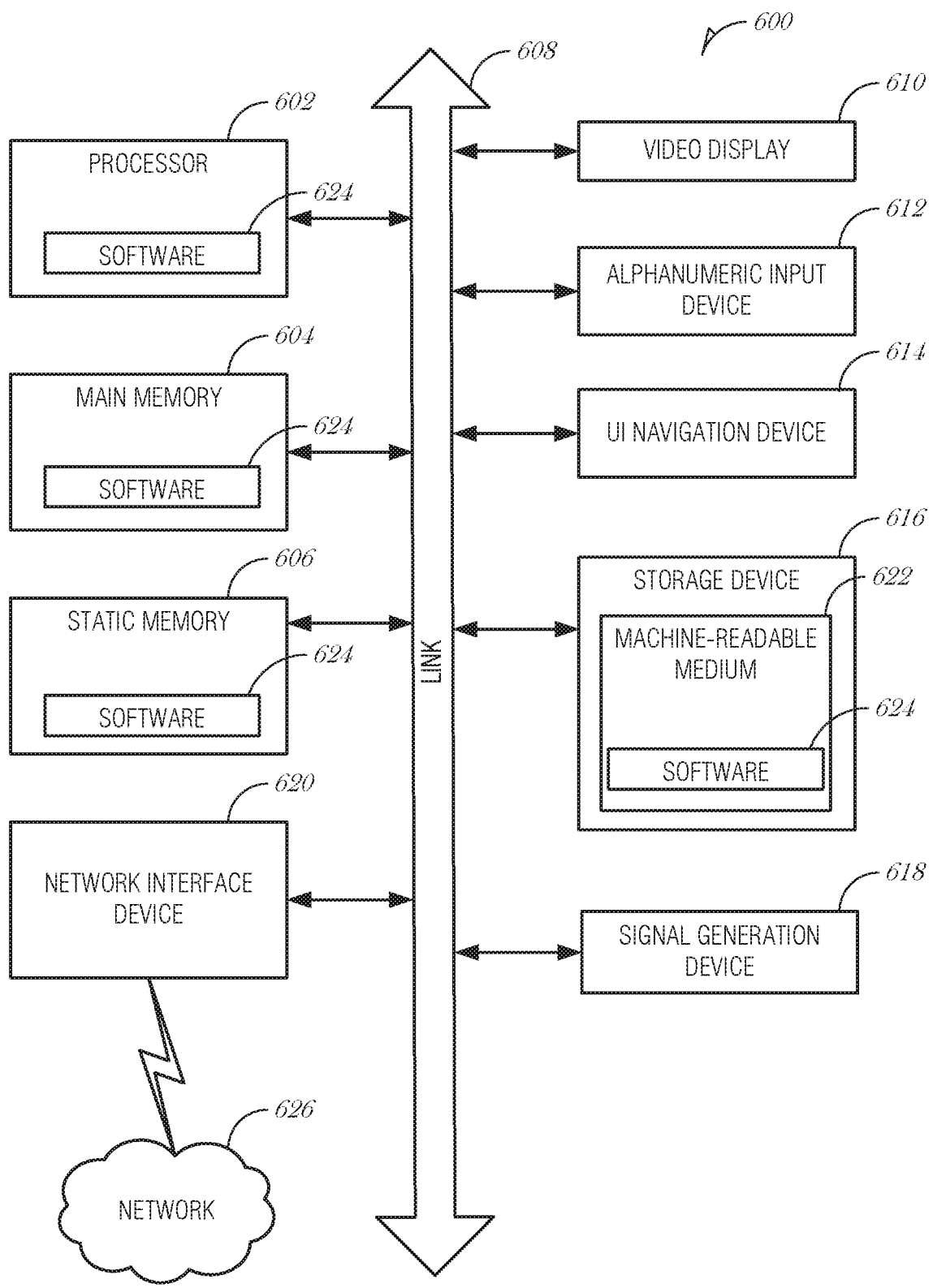
FIG. 6 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, pyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is an anti-collision system for a lead vehicle to provide an alert to a trailing vehicle behind the lead vehicle, the system comprising: a vehicle controller subsystem to: receive from a sensor array interface, sensor data from a rear-facing sensor incorporated into the lead vehicle; determine, using a processor, from the sensor data that the trailing vehicle is a collision risk; and initiate, via a light controller, a visual alert to the trailing vehicle, the visual alert in addition to or in place of brake lights on the lead vehicle.

In Example 2, the subject matter of Example 1 includes, wherein the rear-facing sensor is a radar sensor.

In Example 3, the subject matter of Examples 1-2 includes, wherein the rear-facing sensor is a LIDAR sensor.

In Example 4, the subject matter of Examples 1-3 includes, wherein the rear-facing sensor is a camera sensor.

In Example 5, the subject matter of Examples 1-4 includes, wherein to determine that the trailing vehicle is the collision risk, the vehicle controller subsystem is to: determine a distance between the lead vehicle and the trailing vehicle; determine a relative velocity of the trailing vehicle with respect to the lead vehicle; and determine that the collision risk exists when the distance is not far enough for the trailing vehicle to safely maneuver in view of the relative velocity.

In Example 6, the subject matter of Examples 1-5 includes, wherein to initiate the visual alert, the light controller is to initiate an illumination pattern on a taillight cluster of the lead vehicle.

In Example 7, the subject matter of Example 6 includes, wherein the illumination pattern comprises a series of flashing lights in the taillight cluster.

In Example, 8, the subject matter of Example 7 includes, wherein the series of flashing lights comprises at least two of: a brake light, a turn signal, or a reverse light of the taillight cluster.

In Example 9, the subject matter of Examples 1-8 includes, wherein to initiate the visual alert, the light controller is to initiate an illumination intensity change on a taillight cluster of the lead vehicle.

In Example 10, the subject matter of Example 9 includes, wherein the illumination intensity change comprises increasing an illumination intensity of at least one of: a brake light, a turn signal, or a reverse light of the taillight cluster.

In Example 11, the subject matter of Examples 1-10 includes, wherein to initiate the visual alert, the light controller is to alternatively flash a light in a left taillight cluster and a light in a right taillight cluster of the lead vehicle.

In Example 12, the subject matter of Examples 1-11 includes, wherein to initiate the visual alert, the light controller is to project a visual warning on a rear window of the lead vehicle.

In Example 13, the subject matter of Example 12 includes, wherein the visual warning is one of: a textual message, an icon, a symbol, or a light pattern.

In Example 14, the subject matter of Examples 1-13 includes, wherein to initiate the visual alert, the light controller is to project a visual warning on a roadway surface behind the lead vehicle.

In Example 15, the subject matter of Example 14 includes, wherein the visual warning is one of: a textual message, an icon, a symbol, or a light pattern.

In Example 16, the subject matter of Examples 1-15 includes, wherein to initiate the visual alert, the light controller is to illuminate a light that is not a part of a taillight and not a part of a third-brake light assembly of the lead vehicle.

Example 17 is a method for a lead vehicle to provide an alert to a trailing vehicle behind the lead vehicle, the method comprising: receiving sensor data from a rear-facing sensor incorporated into the lead vehicle; determining from the sensor data that the trailing vehicle is a collision risk; and initiating a visual alert to the trailing vehicle, the visual alert in addition to or in place of brake lights on the lead vehicle.

In Example 18, the subject matter of Example 17 includes, wherein the rear-facing sensor is a radar sensor.

In Example 19, the subject matter of Examples 17-18 includes, wherein the rear-facing sensor is a LIDAR sensor.

In Example 20, the subject matter of Examples 17-19 includes, wherein the rear-facing sensor is a camera sensor.

In Example 21, the subject matter of Examples 17-20 includes, wherein determining that the trailing vehicle is the collision risk comprises: determining a distance between the lead vehicle and the trailing vehicle; determining a relative velocity of the trailing vehicle with respect to the lead vehicle; and determining that the collision risk exists when the distance is not far enough for the trailing vehicle to safely maneuver in view of the relative velocity.

In Example 22, the subject matter of Examples 17-21 includes, wherein initiating the visual alert comprises initiating an illumination pattern on a taillight cluster of the lead vehicle.

In Example 23, the subject matter of Example 22 includes, wherein the illumination pattern comprises a series of flashing lights in the taillight cluster.

In Example 24, the subject matter of Example 23 includes, wherein the series of flashing lights comprises at least two of: a brake light, a turn signal, or a reverse light of the taillight cluster.

In Example 25, the subject matter of Examples 17-24 includes, wherein initiating the visual alert comprises initiating an illumination intensity change on a taillight cluster of the lead vehicle.

In Example 26, the subject matter of Example 25 includes, wherein the illumination intensity change comprises increasing an illumination intensity of at least one of: a brake light, a turn signal, or a reverse light of the taillight cluster.

In Example 27, the subject matter of Examples 17-26 includes, wherein initiating the visual alert comprises alternatively flashing a light in a left taillight cluster and a light in a right taillight cluster of the lead vehicle.

In Example 28, the subject matter of Examples 17-27 includes, wherein initiating the visual alert comprises projecting a visual warning on a rear window of the lead vehicle.

In Example 29, the subject matter of Example 28 includes, wherein the visual warning is one of: a textual message, an icon, a symbol, or a light pattern.

In Example 30, the subject matter of Examples 17-29 includes, wherein initiating the visual alert comprises projecting a visual warning on a roadway surface behind the lead vehicle.

In Example 31, the subject matter of Example 30 includes, wherein the visual warning is one of: a textual message, an icon, a symbol, or a light pattern.

In Example 32, the subject matter of Examples 17-31 includes, wherein initiating the visual alert comprises illuminating a light that is not a part of a taillight and not a part of a third-brake light assembly of the lead vehicle.

Example 33 is at least one machine-readable medium including instructions, which when executed by a machine, cause the machine to perform operations of any of the methods of Examples 17-32.

Example 34 is an apparatus comprising means for performing any of the methods of Examples 17-32.

Example 35 is an apparatus for a lead vehicle to provide an alert to a trailing vehicle behind the lead vehicle, the apparatus comprising: means for receiving sensor data from a rear-facing sensor incorporated into the lead vehicle; means for determining from the sensor data that the trailing vehicle is a collision risk; and means for initiating a visual alert to the trailing vehicle, the visual alert in addition to or in place of brake lights on the lead vehicle.

In Example 36, the subject matter of Example 35 includes, wherein the rear-facing sensor is a radar sensor.

In Example 37, the subject matter of Examples 35-36 includes, wherein the rear-facing sensor is a LIDAR sensor.

In Example 38, the subject matter of Examples 35-37 includes, wherein the rear-facing sensor is a camera sensor.

In Example 39, the subject matter of Examples 35-38 includes, wherein the means for determining that the trailing vehicle is the collision risk comprise: means for determining a distance between the lead vehicle and the trailing vehicle; means for determining a relative velocity of the trailing vehicle with respect to the lead vehicle; and means for determining that the collision risk exists when the distance is not far enough for the trailing vehicle to safely maneuver in view of the relative velocity.

In Example 40, the subject matter of Examples 35-39 includes, wherein the means for initiating the visual alert comprise means for initiating an illumination pattern on a taillight cluster of the lead vehicle.

In Example 41, the subject matter of Example 40 includes, wherein the illumination pattern comprises a series of flashing lights in the taillight cluster.

In Example 42, the subject matter of Example 41 includes, wherein the series of flashing lights comprises at least two of: a brake light, a turn signal, or a reverse light of the taillight cluster.

In Example 43, the subject matter of Examples 35-42 includes, wherein the means for initiating the visual alert comprise means for initiating an illumination intensity change on a taillight cluster of the lead vehicle.

In Example 44, the subject matter of Example 43 includes, wherein the illumination intensity change comprises increasing an illumination intensity of at least one of: a brake light, a turn signal, or a reverse light of the taillight cluster.

In Example 45, the subject matter of Examples 35-44 includes, wherein the means for initiating the visual alert comprise means for alternatively flashing a light in a left taillight cluster and a light in a right taillight cluster of the lead vehicle.

In Example 46, the subject matter of Examples 35-45 includes, wherein the means for initiating the visual alert comprise means for projecting a visual warning on a rear window of the lead vehicle.

In Example 47, the subject matter of Example 46 includes, wherein the visual warning is one of: a textual message, an icon, a symbol, or a light pattern.

In Example 48, the subject matter of Examples 35-47 includes, wherein the means for initiating the visual alert comprise means for projecting a visual warning on a roadway surface behind the lead vehicle.

In Example 49, the subject matter of Example 48 includes, wherein the visual warning is one of: a textual message, an icon, a symbol, or a light pattern.

In Example 50, the subject matter of Examples 35-49 includes, wherein the means for initiating the visual alert comprise means for illuminating a light that is not a part of a taillight and not a part of a third-brake light assembly of the lead vehicle.

Example 51 is at least one machine-readable medium including instructions for a lead vehicle to provide an alert to a trailing vehicle behind the lead vehicle, the instructions when executed by a machine, cause the machine to perform the operations comprising: receiving sensor data from a rear-facing sensor incorporated into the lead vehicle; determining from the sensor data that the trailing vehicle is a collision risk; and initiating a visual alert to the trailing vehicle, the visual alert in addition to or in place of brake lights on the lead vehicle.

In Example 52, the subject matter of Example 51 includes, wherein the rear-facing sensor is a radar sensor.

In Example 53, the subject matter of Examples 51-52 includes, wherein the rear-facing sensor is a LIDAR sensor.

In Example 54, the subject matter of Examples 51-53 includes, wherein the rear-facing sensor is a camera sensor.

In Example 55, the subject matter of Examples 51-54 includes, wherein determining that the trailing vehicle is the collision risk comprises: determining a distance between the lead vehicle and the trailing vehicle; determining a relative velocity of the trailing vehicle with respect to the lead vehicle; and determining that the collision risk exists when the distance is not far enough for the trailing vehicle to safely maneuver in view of the relative velocity.

In Example 56, the subject matter of Examples 51-55 includes, wherein initiating the visual alert comprises initiating an illumination pattern on a taillight cluster of the lead vehicle.

In Example 57, the subject matter of Example 56 includes, wherein the illumination pattern comprises a series of flashing lights in the taillight cluster.

In Example 58, the subject matter of Example 57 includes, wherein the series of flashing lights comprises at least two of: a brake light, a turn signal, or a reverse light of the taillight cluster.

In Example 59, the subject matter of Examples 51-58 includes, Wherein initiating the visual alert comprises initiating an illumination intensity change on a taillight cluster of the lead vehicle.

In Example 60, the subject matter of Example 59 includes, wherein the illumination intensity change comprises increasing an illumination intensity of at least one of: a brake light, a turn signal, or a reverse light of the taillight cluster.

In Example 61, the subject matter of Examples 51-60 includes, wherein initiating the visual alert comprises alternatively flashing a light in a left taillight cluster and a light in a right taillight cluster of the lead vehicle.

In Example 62, the subject matter of Examples 51-61 includes, wherein initiating the visual alert comprises projecting a visual warning on a rear window of the lead vehicle.

In Example 63, the subject matter of Example 62 includes, wherein the visual warning is one of: a textual message, an icon, a symbol, or a light pattern.

In Example 64, the subject matter of Examples 51-63 includes, wherein initiating the visual alert comprises projecting a visual warning on a roadway surface behind the lead vehicle.

In Example 65, the subject matter of Example 64 includes, wherein the visual warning is one of: a textual message, an icon, a symbol, or a light pattern.

In Example 66, the subject matter of Examples 51-65 includes, wherein initiating the visual alert comprises illuminating a light that is not a part of a taillight and not a part of a third-brake light assembly of the lead vehicle.

Example 67 is at least one machine-readable medium including instructions that, when executed by a processor subsystem, cause the processor subsystem to perform operations to implement of any of Examples 1-66.

Example 68 is an apparatus comprising means to implement of any of Examples 1-66.

Example 69 is a system to implement of any of Examples 1-66.

Example 70 is a method to implement of any of Examples 1-66.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An anti-collision system for a lead vehicle to provide an alert to a trailing vehicle behind the lead vehicle, the system comprising:
a vehicle controller subsystem to:
receive from a sensor array interface, sensor data from a rear-facing sensor incorporated into the lead vehicle;
determine, using a processor, from the sensor data that the trailing vehicle is a collision risk by:
determining a distance between the lead vehicle and the trailing vehicle;
determining a relative velocity of the trailing vehicle with respect to the lead vehicle; and
determining that the collision risk exists when the distance is not far enough for the trailing vehicle to safely maneuver in view of the relative velocity; and
initiate, via a light controller, a visual alert to the trailing vehicle, the visual alert in addition to or in place of brake lights on the lead vehicle.

2. The system of claim 1, wherein the rear-facing sensor is a radar sensor.

3. The system of claim 1, wherein the rear-facing sensor is a light imaging detection and ranging (LIDAR) sensor.

4. The system of claim 1, wherein the rear-facing sensor is a camera sensor.

5. The system of claim 1, wherein to initiate the visual alert, the light controller is to initiate an illumination pattern on a taillight cluster of the lead vehicle.

6. The system of claim 5, wherein the illumination pattern comprises a series of flashing lights in the taillight cluster.

7. The system of claim 6, wherein the series of flashing lights comprises at least two of: a brake light, a turn signal, or a reverse light of the taillight cluster.

8. The system of claim 1, wherein to initiate the visual alert, the light controller is to initiate an illumination intensity change on a taillight cluster of the lead vehicle.

9. The system of claim 8, wherein the illumination intensity change comprises increasing an illumination intensity of at least one of: a brake light, a turn signal, or a reverse light of the taillight cluster.

10. The system of claim 1, wherein to initiate the visual alert, the light controller is to alternatively flash a light in a left taillight cluster and a light in a right taillight cluster of the lead vehicle.

11. The system of claim 1, wherein to initiate the visual alert, the light controller is to project a visual warning on a rear window of the lead vehicle.

12. The system of claim 11, wherein the visual warning is one of: a textual message, an icon, a symbol, or a light pattern.

13. The system of claim 1, wherein to initiate the visual alert, the light controller is to project a visual warning on a roadway surface behind the lead vehicle.

14. The system of claim 13, wherein the visual warning is one of: a textual message, an icon, a symbol, or a light pattern.

15. The system of claim 1, wherein to initiate the visual alert, the light controller is to illuminate a light that is not a part of a taillight and not a part of a third-brake light assembly of the lead vehicle.

16. A method for a lead vehicle to provide an alert to a trailing vehicle behind the lead vehicle, the method comprising:
receiving sensor data from a rear-facing sensor incorporated into the lead vehicle;
determining from the sensor data that the trailing vehicle is a collision risk by:
determining a distance between the lead vehicle and the trailing vehicle;
determining a relative velocity of the trailing vehicle with respect to the lead vehicle; and
determining that the collision risk exists when the distance is not far enough for the trailing vehicle to safely maneuver in view of the relative velocity; and
initiating a visual alert to the trailing vehicle, the visual alert in addition to or in place of brake lights on the lead vehicle.

17. The method of claim 16, wherein the rear-facing sensor is a radar sensor.

18. The method of claim 16, wherein the rear facing sensor is a light imaging detection and ranging (LIDAR) sensor.

19. The method of claim 16, wherein the rear-facing sensor is a camera sensor.

20. At least one non-transitory machine-readable medium including instructions for a lead vehicle to provide an alert to a trailing vehicle behind the lead vehicle, the instructions when executed by a machine, cause the machine to perform the operations comprising:
receiving sensor data from a rear-facing sensor incorporated into the lead vehicle;
determining from the sensor data that the trailing vehicle is a collision risk by:
determining a distance between the lead vehicle and the trailing vehicle;
determining a relative velocity of the trailing vehicle with respect to the lead vehicle; and
determining that the collision risk exists when the distance is not far enough for the trailing vehicle to safely maneuver in view of the relative velocity; and
initiating a visual alert to the trailing vehicle, the visual alert in addition to or in place of brake lights on the lead vehicle.

21. The non-transitory machine-readable medium of claim 20, wherein initiating the visual alert comprises initiating an illumination pattern on a taillight cluster of the lead vehicle.

22. The non-transitory machine-readable medium of claim 21, wherein the illumination pattern comprises a series of flashing lights in the taillight cluster.

* * * * *